Nov. 11, 1952 C. W. JONES 2,617,924
WIDE FREQUENCY BAND TRANSMIT-RECEIVE SWITCH
Filed March 8, 1945
FIG. 1
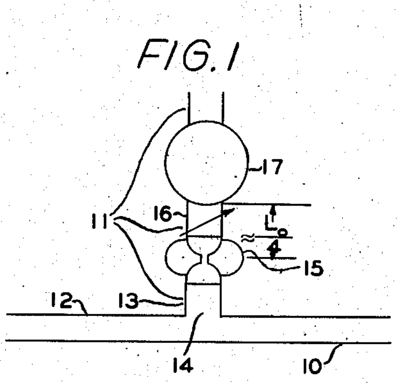
FIG. 2
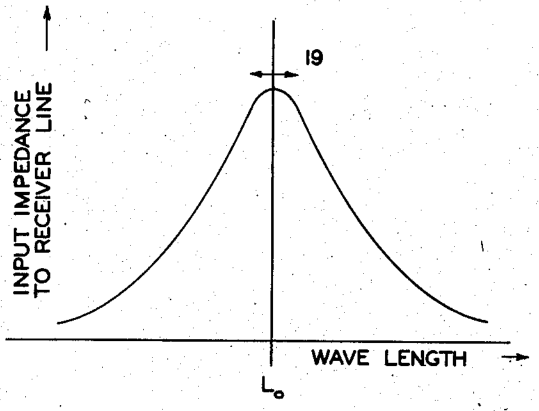
FIG. 5
FIG. 4 FIG. 3
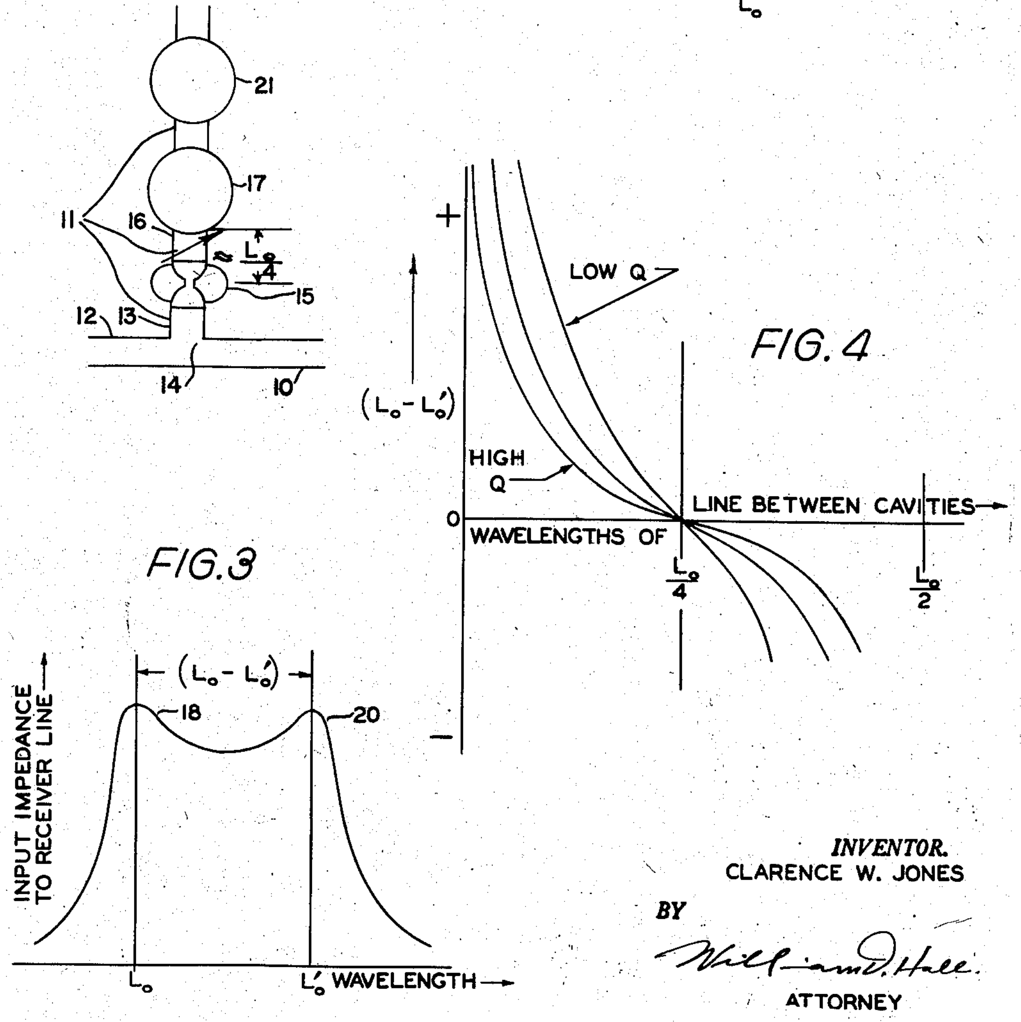
INVENTOR.
CLARENCE W. JONES
BY William D. Hall
ATTORNEY Patented Nov. 11, 1952

2,617,924

UNITED STATES PATENT OFFICE 2,617,924

WIDE FREQUENCY BAND TRANSMIT-RECEIVE SWITCH

Clarence W. Jones, Boston, Mass., assignor to the United States of America as represented by the Secretary of War Application March 8, 1945, Serial No. 581,694

5 Claims. (Cl. 250—13)

This invention relates in general to electrical switches, and more particularly to electrical switches which operate automatically by virtue of the energy reflected from a conducting spark gap, said spark gap being broken down by the large amount of energy fed to the device.

According to conventional electronic circuit practice for some purposes, a radio receiver and a radio pulse transmitter use the same antenna. The power output of the transmitter may be $10^6$ to $10^{12}$ times as great as the rated power input to the receiver. Thus, if no arrangement is made to effectively disconnect the receiver from the antenna during the period in which the transmitter is transmitting, several input stages of the receiver may be put out of commission, with the result that the thermionic tubes or crystals that may be in these stages will be burned out.

Under some conditions, the transmitter sends out pulses periodically at an audio rate, and it is desirable that the receiver be effectively disconnected from the antenna line as soon as a pulse leaves the transmitter and that it be effectively reconnected to the antenna line at the end of the transmitted pulse. Due to the high pulse repetition frequency that may be used, and the steepness of the leading and trailing edges of the pulses, a sensitive device which is automatically operated by the transmitted pulse itself is used, in order to obtain a high degree of accuracy.

In cases where the carrier frequency of the pulse transmitter is very high, the switch takes the form of a spark gap placed across the receiver line a quarter wavelength from the junction of the receiver line and the transmitter line. This junction will hereafter be called the T-junction. A pulse of energy from the transmitter divides between the path to the antenna and the path to the receiver. The energy going down the receiver path fires the spark gap, which then becomes a very small resistance across the line. The line is a quarter wavelength long, so the input to the receiver line appears like a very high input resistance at the T-junction, and after the spark gap is fired substantially all of the energy of the transmitted pulse goes to the antenna. In order to increase the available firing voltage across the gap and therefore the sensitivity of the device, the spark gap itself is made to form a portion of a re-entrant cavity resonator, with the gap placed at the position of maximum electric field. When the pulse ends, the spark gap goes out and the device presents very little attenuation in the receiver line to the received signals.

As is well understood in the art, however, the response characteristic of such an electrical switch is very highly frequency selective, and if the transmitter frequency is changed slightly as is often the case, it is necessary to retune the cavity resonator in order that sufficient protection for the receiver be maintained. If the ratio of energy stored in the cavity to energy lost in the cavity, called the Q, is lowered sufficiently to permit the cavity resonator to operate over a band of frequencies, the device is found to be too insensitive, and an undesirable amount of the energy contained in the transmitted pulse gets through to the receiver before the spark gap breaks down.

Among the objects of the present invention, therefore, are:

1. To provide a cavity resonator-spark gap type of electrical switch that effectively electrically disconnects the receiver from the antenna when the transmitter is transmitting.

2. To provide such an electrical switch which gives sufficient receiver protection over a band of frequencies.

3. To provide such a switch that has the responsive frequency band adjustable in width and position with respect to an original frequency.

4. To provide such a switch that operates with no decrease in sensitivity over the single-frequency-response type.

In accordance with the present invention, there is provided an electronic system wherein a receiver and a transmitter are permanently physically connected to the same antenna. A quarter wavelength down the receiver line from the T-junction is a cavity resonator-spark gap arrangement, similar to that ordinarily used in the art. Substantially a quarter wavelength down the receiver line from the spark gap is a high-Q cavity resonator. The former quarter wavelength line, the cavity resonator-spark gap, the latter quarter wavelength line and the latter high-Q cavity resonator are in cascade. The line from the spark gap to the high-Q cavity resonator is variable in length in order to make the frequency band-response characteristic of the device adjustable. More high-Q cavity resonators could be added in cascade if greater bandwidths were desired, and spark gaps could be placed in two or more of the cavities if greater sensitivity is desired.

My invention will best be understood with reference to the drawings in which:

Fig. 1 shows a circuit diagram of the device according to my invention.

Fig. 2 is a curve illustrating the variation with operating wavelength of the input impedance to the receiver line at the T-junction using a single cavity resonator-spark gap arrangement.

Fig. 3 is a curve illustrating the variation with wavelength of the input impedance to the receiver line at the T-junction using the two-cavity resonator arrangement, according to my invention.

Fig. 4 is a curve illustrating the variation of the band width of the two-cavity resonator device according to my invention with wavelength of the line connecting the two cavities and with Q.

Figure 5 shows another embodiment of the invention.

Referring now more particularly to Fig. 1, there is shown the antenna line 10 to which is connected both the receiver line 11 and the transmitter line 12. A quarter wavelength line 13 as marked connects the T-junction 14 and the cavity resonator-spark gap arrangement 15. The line 13 can, for example, be a telescoping section of wave guide. The cavity is of the conventional re-entrant type used in this type of device with the spark gap making up the narrowest portion. Coupled to the cavity resonator-spark gap arrangement 15 is a line 16 the length of which is in the neighborhood of a quarter wavelength, and which may be adjusted above and below a quarter wavelength. The line is coupled to a high-Q resonator 17, out of which is extracted the energy which goes into the receiver.

Referring now to the operation of the system and to Fig. 1, when the energy contained in the transmitted pulse reaches the T-junction 14, a portion of it goes down the antenna line 10 and a portion goes up the receiver line 13. The spark gap is of such sensitivity that the energy going up the receiver line causes the gap to fire. The arc effectively puts a very low impedance across the receiver line and thus effectively short circuits the receiver during transmission periods. Thus as soon as the energy to fire the spark gap reaches it and the reflected impedance is felt at the T-junction, substantially all the transmitted energy goes to the antenna.

Using the conventional cavity resonator-spark gap arrangement alone, the input impedance to the receiver line varies with wavelength as illustrated in Fig. 2. $L_0$, the rated wavelength of the system, is the wavelength at which the cavity resonator is resonant, and sufficient receiver protection is obtained only in the neighborhood 19 of the maximum point on the curve. Thus it is seen that such a device is useful for only a very narrow range of frequencies.

The addition in cascade of the line 16 the length of which is in the neighborhood of a quarter wavelength and the high-Q cavity resonator 17 has the effect of increasing the band width of frequencies at which there is sufficient receiver protection. The impedance characteristic of the device then takes on the shape of the curve of Fig. 3, this curve illustrating a case when the line 16 is less than $L_0/4$. It is seen that the curve takes on a double-hump shape, which is characteristic of two tuned circuits coupled tightly together. One of the humps 18 is at $L_0$, this being the resonant wavelength of the two cavity resonators. The other hump 20 is at such a wavelength $L_0'$ that the reactance looking into line 16 from cavity resonator 15 is equal and of opposite sign to the reactance of the cavity resonator 15 at wavelength $L_0'$. Thus the effect is to produce effectively another point of resonance within the cavity resonator, and so to produce another wavelength at which the receiver protection is a maximum. In practice, attenuation within the system may smooth down the humps over the amount shown.

The distance $L_0—L_0'$ between the two humps, and whether the bandpass characteristic extends above or below the wavelength $L_0$, is dependent upon the length of the line 16 as compared to $L_0/4$. The band width at which the device offers sufficient receiver protection as a function of the length of the line 16 as a fraction of $L_0$ is illustrated in Fig. 4. When the line 16 is less than $L_0/4$, $L_0—L_0'$ is positive and the band of usable wave lengths extends in the direction of increasing wavelength. When the line 16 is more than $L_0/4$, $L_0—L_0'$ is negative and the band of usable wavelengths extends in the direction of decreasing wavelength. For a given line length, the lower the Q of the cavity resonators the greater is the absolute value of $L_0—L_0'$. The curves for high and low Q are so marked.

Figure 5 shows another embodiment of the invention which differs from that shown in Figure 1 in that another cavity resonator 21 is disposed approximately a quarter wavelength away from resonator 17. The effect is to further broaden the bandwidth.

While there has been described what is at present considered the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In an electronic system containing a receiver branch, a transmitter branch and an antenna branch, and wherein said receiver branch and said transmitter branch are both connected to said antenna branch, an electrical switch connected in said receiver branch, said switch comprising a plurality of cavity resonators all connected in series in said receiver branch, a spark gap forming a portion of one of said cavity resonators, an adjustable-length line connecting the cavity resonator containing the spark gap with one of the other cavity resonators and having a length approximately but not exactly equal to a quarter wavelength of an operating frequency of said system, means connecting said cavity resonators and said line in cascade in said receiver branch, said switch operating to effectively electrically disconnect said receiver branch from said antenna branch by firing the spark gap by energy received from said transmitter branch.

2. In an electrical system containing three branches, two of said branches being connected to the third branch, an electrical switch connected in the second branch, said switch comprising a plurality of high-impedance tuned elements all connected in series in said second branch, a spark gap forming a portion of one of said high-impedance tuned elements, an adjustable-length line connecting the high-impedance tuned element containing the spark gap with one of the other high-impedance tuned elements and having a length approximately but not exactly equal to a quarter wavelength of an operating frequency of said system, means connecting said tuned elements and said line in cascade in said second branch, said switch operating to effectively electrically disconnect said second branch from said third branch by firing the spark gap by energy received from said first branch.

3. In an electrical system having a plurality of branches and wherein one of said branches is electrically connected to the others of said branches, means in one of said branches for isolating it from the others during transmission of power in excess of a predetermined amount, said means comprising a spark gap, a plurality of high-impedance tuned circuits one of which contains said spark gap, and transmission means having an adjustable length, said transmission means connecting the high-impedance tuned circuit containing said spark gap with one of the other high-impedance tuned circuits, said high-impedance tuned circuits being tuned to the same frequency and connected in series in the branch to be isolated.

4. An electric switch for coupling a receiver to an antenna branch to which a transmitter is also coupled comprising a first line for coupling to said antenna branch, a first cavity resonator coupled to said first line and provided with a spark gap, a second line coupled to said first resonator and having a length approximately but not exactly equal to an odd multiple of said quarter wavelength, a second cavity resonator coupled to said second line, both said resonators being tuned to said operating frequency, and means for coupling said second resonator to said receiver whereby said switch effectively electrically disconnects said receiver from said antenna branch during the transmission of energy covering a wide band of frequencies from said transmitter.

5. An electric switch according to claim 4 further comprising a third cavity resonator tuned to said operating frequency and a third line coupling said third resonator to said second resonator and having a length approximately but not exactly an odd multiple of said quarter wavelength, said third resonator forming said means for coupling to said receiver.

CLARENCE W. JONES.

REFERENCES CITED

The following references are of record in the file of this patent:

UNITED STATES PATENTS

| Number | Name | Date |
|---|---|---|
| 1,035,958 | Girardeau | Aug. 20, 1912 |
| 2,445,445 | Marcum | July 20, 1948 |
| 2,485,606 | Kandoian | Oct. 25, 1949 |
| 2,531,122 | Fiske | Nov. 21, 1950 |